US012634746B2

(12) United States Patent
Fujishiro et al.

(10) Patent No.: US 12,634,746 B2
(45) Date of Patent: May 19, 2026

(54) COMMUNICATION CONTROL METHOD

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 398 days.

(21) Appl. No.: 18/305,162

(22) Filed: Apr. 21, 2023

(65) Prior Publication Data

US 2023/0262516 A1      Aug. 17, 2023

Related U.S. Application Data

(63) Continuation of application No. PCT/JP2021/038913, filed on Oct. 21, 2021.

(60) Provisional application No. 63/104,034, filed on Oct. 22, 2020.

(51) Int. Cl.
*H04W 28/02* (2009.01)
*H04W 40/24* (2009.01)

(52) U.S. Cl.
CPC ..... *H04W 28/0273* (2013.01); *H04W 40/248* (2013.01)

(58) Field of Classification Search
CPC ........................ H04W 28/0273; H04W 40/248
See application file for complete search history.

(56) References Cited

U.S. PATENT DOCUMENTS

2023/0164658 A1* 5/2023 Ishii .................. H04W 36/0055
370/331

OTHER PUBLICATIONS

3rd Generation Partnership Project; Technical Specification Group Radio Access Network; NR; NR and NG-RAN Overall Description; Stage 2 (Release 16); 3GPP TS 38.300 V16.2.0; Jul. 2020; Total 6 pages.
Nokia (moderator); "Summary of Offline Discussion on CB: #8 Topology Redundancy"; Online; 3GPP TSG-RAN WG3 #108-e, R3-205468; Jun. 1-11, 2020; Total 19 pages.
Futurewei; "Remaining Issues for IAB Routing"; 3GPP TSG-RAN WG2 meeting #108, R2-1914514 (revison of R2-1913538); Nov. 18-22, 2019; Reno, Nevada, USA; Total 8 pages.
Intel Corporation, "(TP for NR-IAB BL CR for 38.401) Correction on intra-CU topological redundancy procedure", 3GPP TSG-RAN WG3 Meeting #108-e, R3-203778, Electronic Meeting, Jun. 1-11, 2020, Total 6 pages.

* cited by examiner

*Primary Examiner* — Yemane Mesfin
*Assistant Examiner* — Jia Hao Deng
(74) *Attorney, Agent, or Firm* — Studebaker Brackett PLLC

(57) ABSTRACT
In a first aspect, a communication control method is used in a cellular communication system. The communication control method includes transmitting, by a first relay node subordinate to a first donor base station, a first packet to a second donor base station different from the first donor base station. The communication control method includes forwarding, by the second donor base station, the first packet to the first donor base station by using a path for data forwarding, and transmitting, by the first donor base station, the first packet to a network.

5 Claims, 15 Drawing Sheets

COMMUNICATION CONTROL METHOD

RELATED APPLICATIONS

The present application is a continuation based on PCT Application No. PCT/JP2021/038913, filed on Oct. 21, 2021, which claims the benefit of U.S. Provisional Application No. 63/104,034 filed on Oct. 22, 2020. The content of which is incorporated by reference herein in their entirety.

TECHNICAL FIELD

The present invention relates to a communication control method used in a cellular communication system.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.2.0 (2020-07)") is being considered. One or more relay nodes are involved in communication between a base station and a user equipment, and perform relay for the communication.

SUMMARY

In a first aspect, a communication control method is used in a cellular communication system. The communication control method includes transmitting, by a first relay node subordinate to a first donor base station, a first packet to a second donor base station different from the first donor base station. The communication control method includes forwarding, by the second donor base station, the first packet to the first donor base station by using a path for data forwarding, and transmitting, by the first donor base station, the packet to a network.

In a second aspect, a communication control method is used in a cellular communication system. The communication control method includes inquiring, by a first relay node subordinate to a first donor base station, from a second relay node whether the second relay node includes a path to the first donor base station, the second relay node being subordinate to a second donor base station different from the first donor base station. The communication control method includes transmitting, by the second relay node, to the first relay node, a response to the inquiry when the second relay node includes the path to the first donor base station.

In a third aspect, a communication control method is used in a cellular communication system. The communication control method includes transmitting, by a first user equipment functioner of a relay node, to a first donor base station, a second BAP address configured for a second user equipment functioner of the relay node by a second donor base station, the first user equipment functioner being configured with a first BAP address by the first donor base station. The communication control method includes transmitting, by the second user equipment functioner, the first BAP address to the second donor base station.

In a fourth aspect, a communication control method is used in a cellular communication system. The communication control method includes configuring a relay node with a first BAP address for a first user equipment functioner from a first donor base station, the relay node including the first user equipment functioner. The communication control method includes transmitting, by the relay node, a second BAP address to a second donor base station when establishing a connection to the second donor base station.

DESCRIPTION OF EMBODIMENTS

A cellular communication system according to an embodiment is described with reference to the drawings. In the description of the drawings, the same or similar parts are denoted by the same or similar reference signs.
Configuration of Cellular Communication System A configuration example of the cellular communication system according to an embodiment is described. In the embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system 1. A future cellular communication system such as 6G may be applied to the cellular communication system 1.

Figure 1:
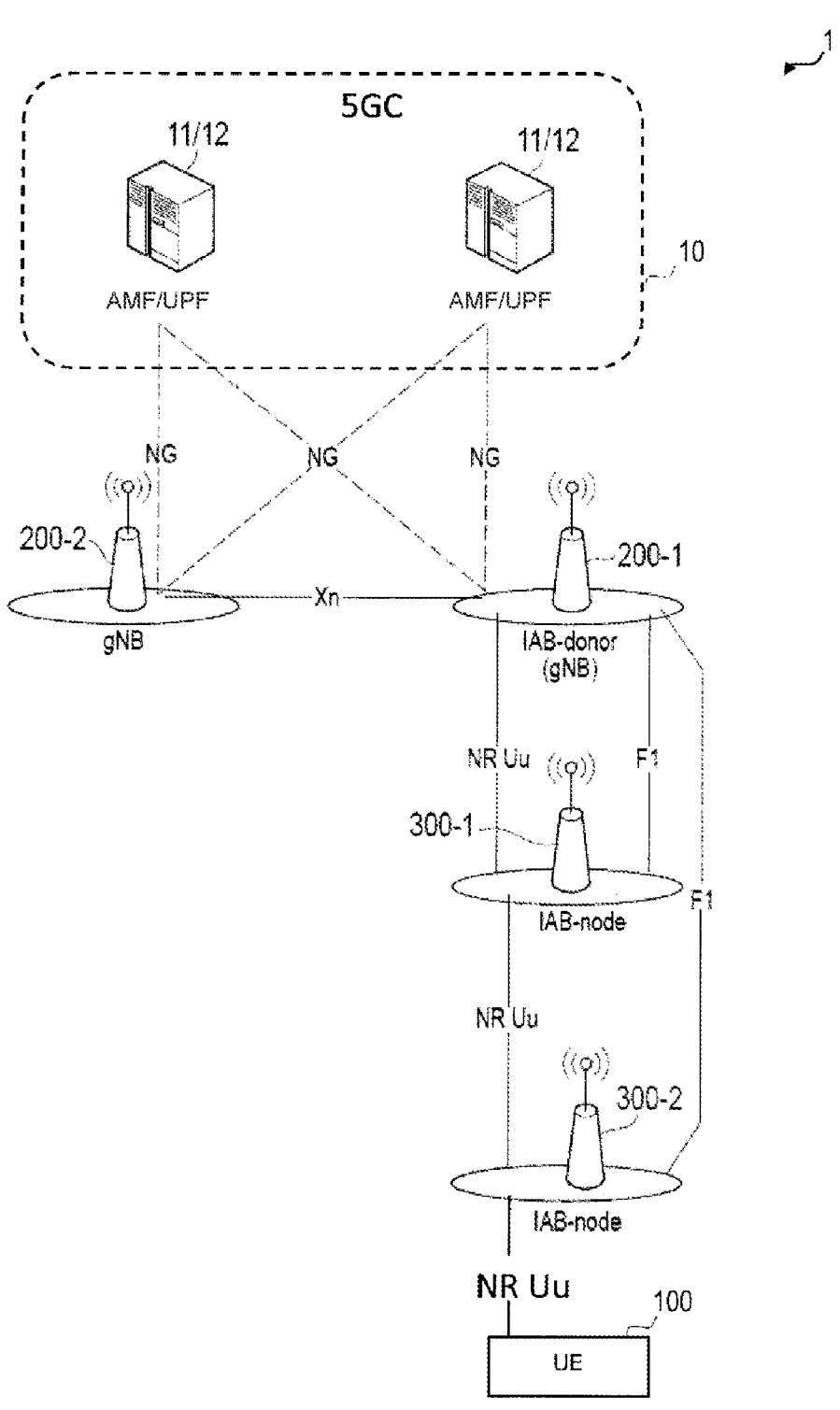
FIG. 1 is a diagram illustrating a configuration example of a cellular communication system according to an embodiment.

FIG. 1 is a diagram illustrating a configuration example of the cellular communication system 1 according to the embodiment.

As illustrated in FIG. 1, the cellular communication system 1 includes a 5G core network (5GC) 10, a User Equipment (UE) 100, base station apparatuses (hereinafter, also referred to as base stations) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency. Hereinafter, the cell and the base station may be used without distinction.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU, and includes an F1-C protocol that is a control plane protocol and an F1-U protocol that is a user plane protocol.

The cellular communication system 1 supports an IAB that uses NR for the backhaul to enable wireless relay of the NR access. The donor gNB 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 includes a mobile phone terminal, a tablet terminal, a laptop PC, a sensor or an apparatus that is provided in a sensor, a vehicle or an apparatus that is provided in a vehicle, and an aircraft or an apparatus provided in an aircraft. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
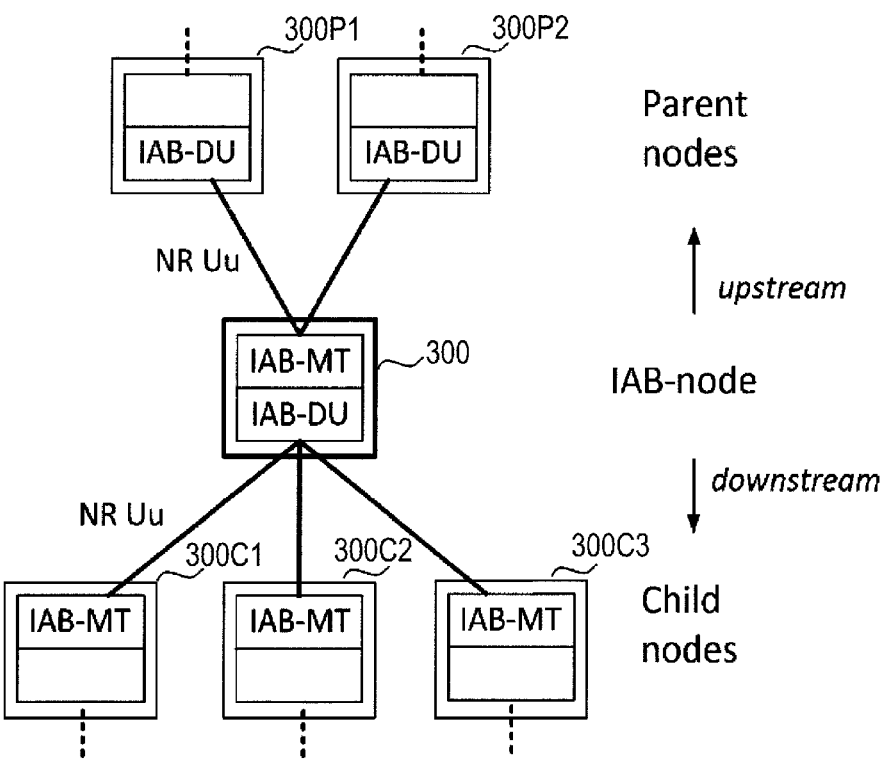
FIG. 2 is a diagram illustrating a relationship between an IAB node, parent nodes, and child nodes.

FIG. 2 is a diagram illustrating a relationship between the IAB node 300, parent nodes, and child nodes.

As illustrated in FIG. 2, each IAB node 300 includes an IAB-DU corresponding to a base station functioner and an IAB-Mobile Termination (MT) corresponding to a user equipment functioner.

Neighboring nodes of the IAB-MT (i.e., upper node) of an NR Uu wireless interface are referred to as "parent nodes". The parent node is the DU of a parent IAB node or the donor gNB 200. A radio link between the IAB-MT and each parent node is referred to as a backhaul link (BH link). FIG. 2 illustrates an example in which the parent nodes of the IAB node 300 are IAB nodes 300P1 and 300P2. Note that the direction toward the parent nodes is referred to as upstream. The upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor gNB 200-1. FIG. 2 illustrates an example in which the child nodes of the IAB node 300 are IAB nodes 300C1 to 300C3, but the child nodes of the IAB node 300 may include the UE 100. Note that the direction toward the child nodes is referred to as downstream.

Configuration of Base Station

Figure 3:
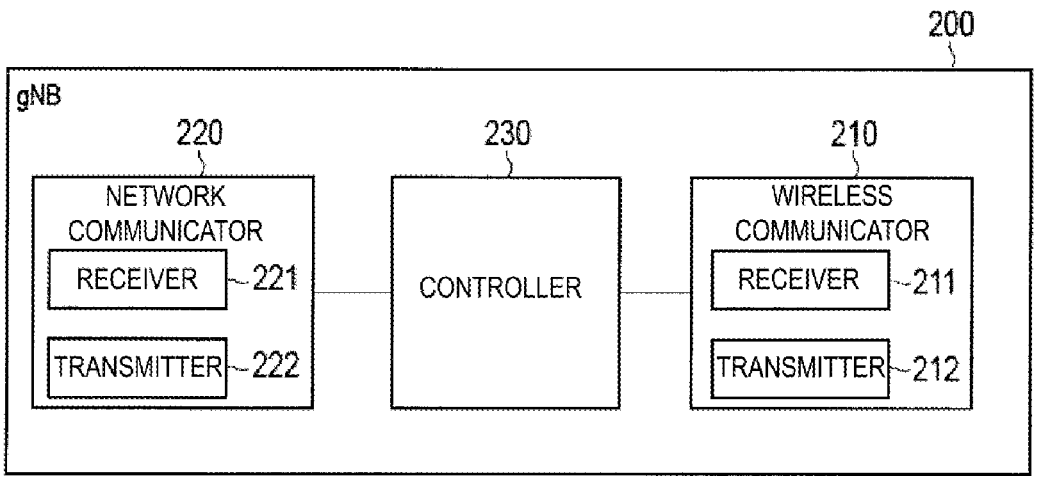
FIG. 3 is a diagram illustrating a configuration example of a gNB (base station) according to the embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and the IAB node 300. The wireless communicator 210 includes a receiver 211 and a transmitter 212. The receiver 211 performs various types of receptions under control of the controller 230. The receiver 211 includes an antenna and converts (down-converts) a radio signal received by the antenna into a baseband signal (reception signal) to output the baseband signal to the controller 230. The transmitter 212 performs various types of transmissions under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and another neighboring gNB 200. The network communicator 220 includes a receiver 221 and a transmitter 222. The receiver 221 performs various types of receptions under control of the controller 230. The receiver 221 receives a signal from an external source and outputs the reception signal to the controller 230. The transmitter 222 performs various types of transmissions under control of the controller 230. The transmitter 222 transmits the transmission signal output by the controller 230 to an external destination.

The controller 230 performs various types of controls in the gNB 200. The controller 230 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of the baseband signal. The CPU executes the program stored in the memory to perform various types of processing. The processor performs processing of the layers described below. The controller 230 may perform all of the processing in the gNB 200 in each embodiment described below.

Configuration of Relay Node

Figure 4:
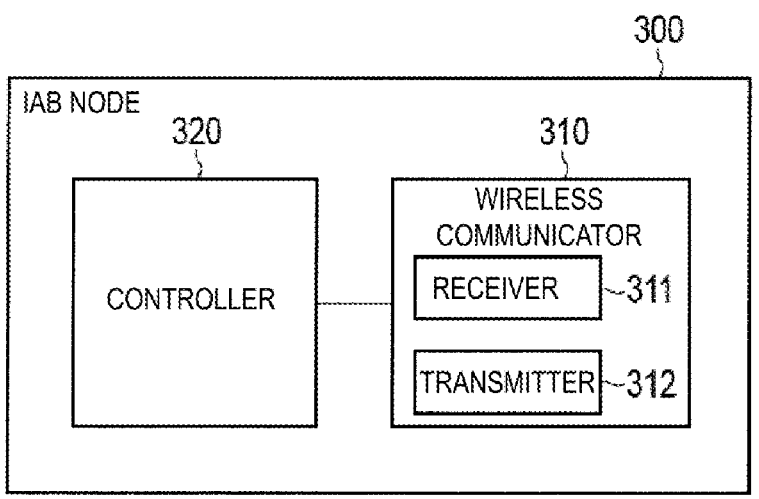
FIG. 4 is a diagram illustrating a configuration example of an IAB node (relay node) according to the embodiment.

A configuration of the IAB node 300 that is a relay node (or a relay node apparatus, which is hereinafter also referred to as a "relay node") according to the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna and converts (down-converts) a radio signal received by the antenna into a baseband signal (reception signal) to output the baseband signal to the controller 320. The transmitter 312 performs various types of transmissions under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of the baseband signal. The CPU executes the program stored in the memory to perform various types of processing. The processor performs processing of the layers described below. The controller 320 may perform all of the processing in the IAB node 300 in each embodiment described below.

Figure 5:
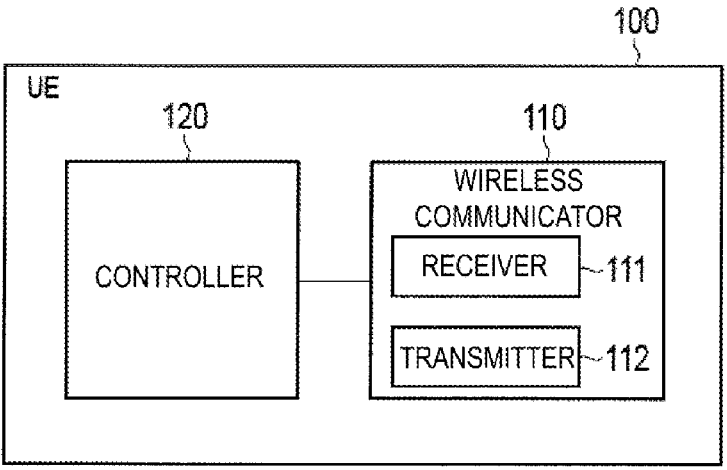
FIG. 5 is a diagram illustrating a configuration example of a UE (user equipment) according to the embodiment.

Configuration of User Equipment A configuration of the UE 100 that is a user equipment according to the embodiment is described next. FIG. 5 is a diagram illustrating a configuration of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., with another UE 100. The wireless communicator 110 includes a receiver 111 and a transmitter 112. The receiver 111 performs various types of receptions under control of the controller 120. The receiver 111 includes an antenna and converts (down-converts) a radio signal received by the antenna into a baseband signal (reception signal) which is then transmitted to the controller 120. The transmitter 112 performs various types of transmissions under control of the controller 120. The transmitter 112 includes an antenna and converts (up-converts) the baseband signal (transmission signal) output by the controller 120 into a radio signal which is then transmitted from the antenna.

The controller 120 performs various types of controls in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of the baseband signal. The CPU executes the program stored in the memory to thereby perform various types of processing. The processor performs processing of the layers described below. The controller 120 may perform all of the processing in the UE 100 in each embodiment described below.

Configuration of Protocol Stack

Figure 6:
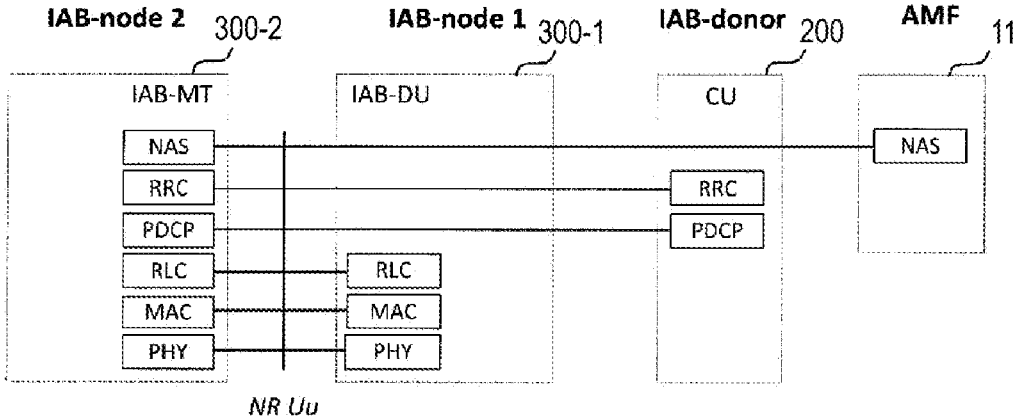
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using the functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200. When an RRC connection to the donor gNB 200 is present, the IAB-MT is in an RRC connected state. When no RRC connection to the donor gNB 200 is present, the IAB-MT is in an RRC idle state.

The NAS layer, which is positioned higher than the RRC layer, performs session management, mobility management, and the like. NAS signaling is transmitted between the NAS layer of the IAB-MT of the IAB node 300-2 and the AMF 11.

Figure 7:
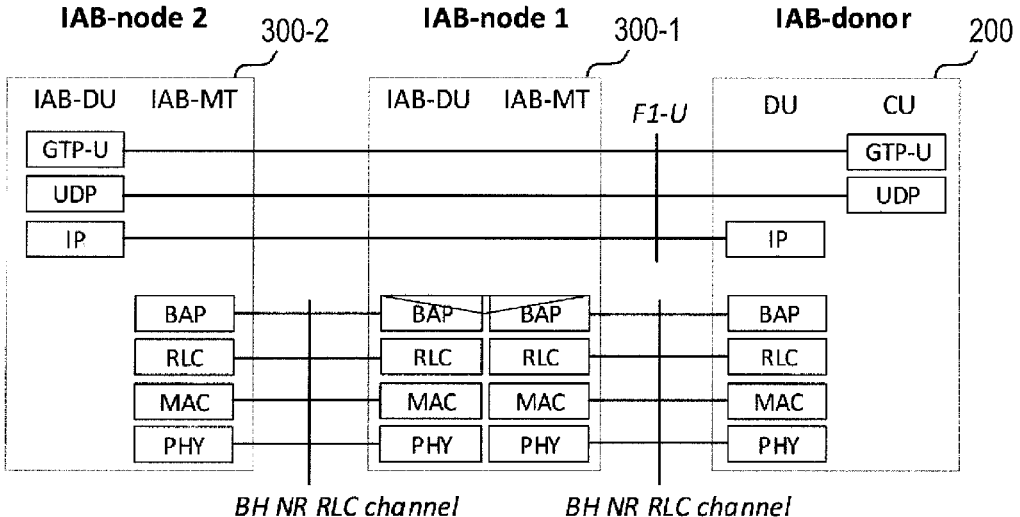
FIG. 7 is a diagram illustrating an example of a protocol stack related to an F1-U protocol.
Figure 8:
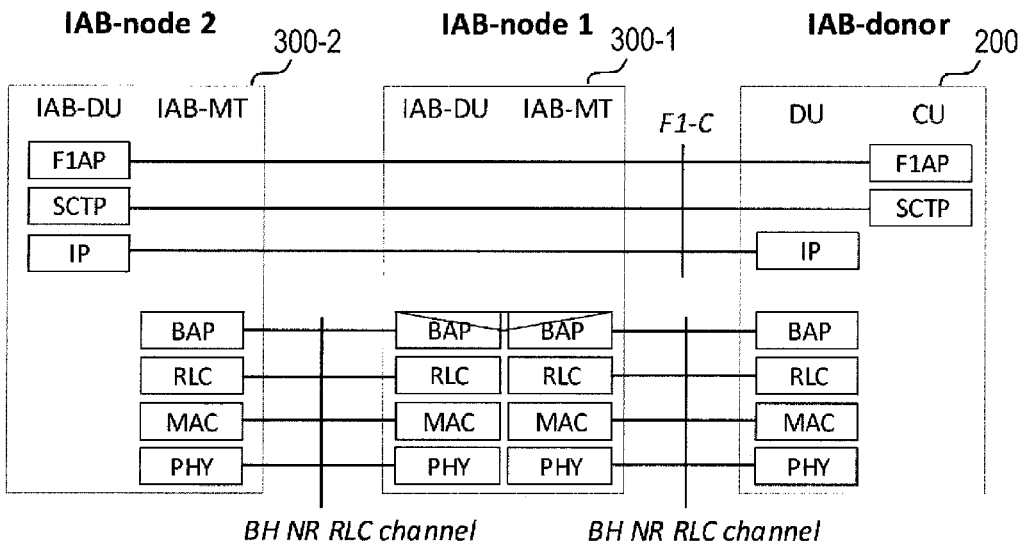
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example in which the donor gNB 200 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200 includes a Backhaul Adaptation Protocol (BAP) layer as a higher layer than the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring each BH link to include multiple backhaul RLC channels enables the prioritization and QoS control of traffic. The association between the BAP PDU and the backhaul RLC channel is performed by the BAP layer of each IAB node 300 and the BAP layer of the donor gNB 200.

As illustrated in FIG. 8, the protocol stack of the F1-C protocol includes an F1AP layer and an SCTP layer instead of a GTP—U layer and a UDP layer illustrated in FIG. 7.

First Embodiment

When a failure occurs in the BH link between the IAB node 300 and the donor gNB (hereinafter, also referred to as an "IAB donor") 200-1, the IAB node 300 cannot transmit UL packets to the IAB donor 200-1 anymore.

In such a case, when the IAB node 300 forwards an UL packet to an IAB donor 200-2 that is different from the IAB donor 200-1, the IAB donor 200-2 cannot de-cipher the packet even when receiving the packet. This is because the UL packet is originally forwarded from the UE 100 to the IAB donor 200-1, and is ciphered through the PDCP connection between the UE 100 and the IAB donor 200-1.

In the first embodiment, the IAB node 300 transmits an UL packet to the IAB donor 200-2 through re-routing. The IAB donor 200-2 then forwards the UL packet to the IAB donor 200-1 through a data forwarding path configured between the IAB donor 200-2 and the IAB donor 200-1.

As a result, the UL packet forwarded to the IAB donor 200-2 is transmitted to the original IAB donor 200-1, enabling the IAB donor 200-1 to de-cipher and transmit the UL packet to the UPF 12.

Note that re-routing via the IAB donors 200-1 and 200-2 in this way may be referred to as inter-donor-DU re-routing (or inter-donor re-routing). The inter-donor-DU re-routing may hereinafter be referred to as "re-routing".

Figure 9:
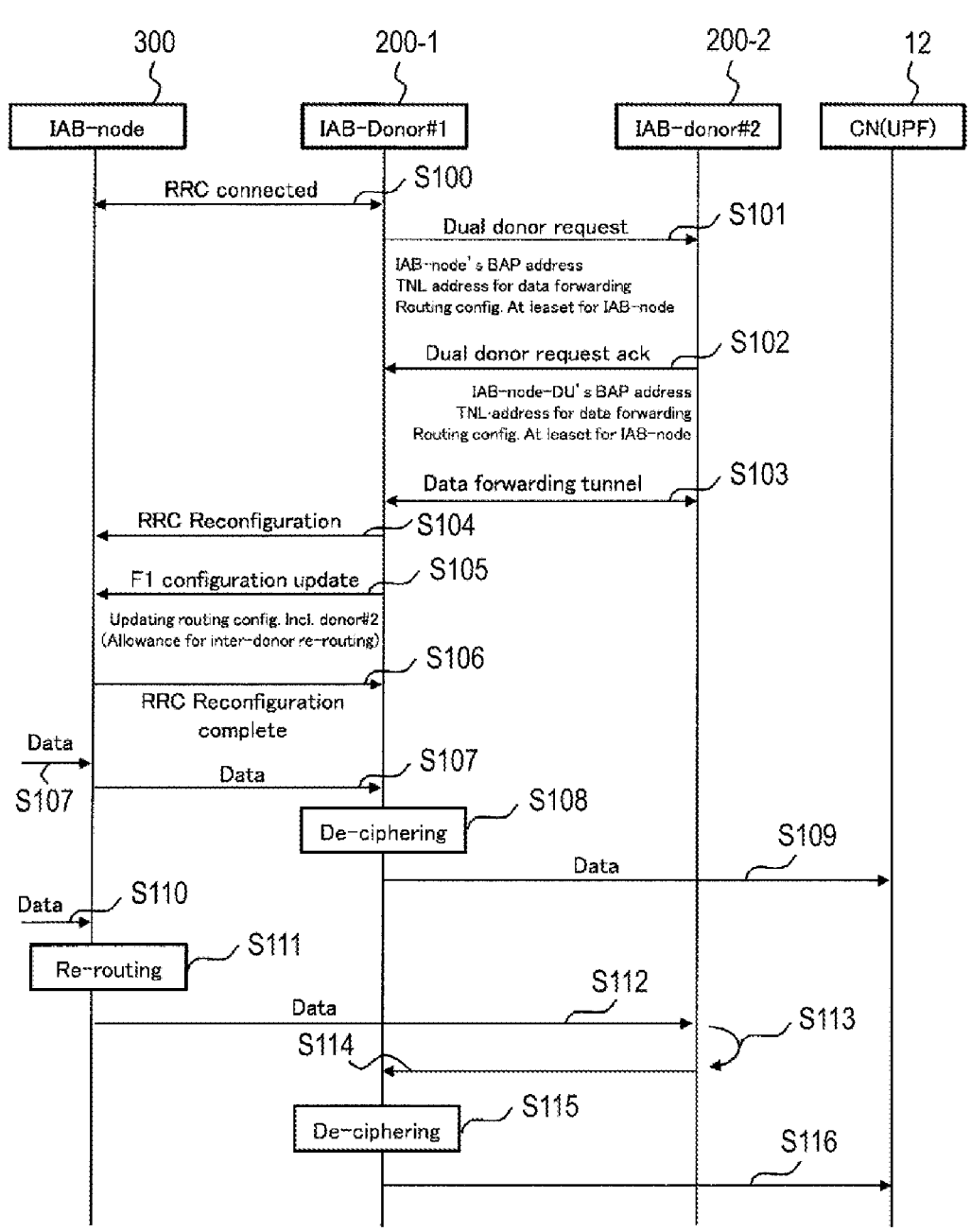
FIG. 9 is a diagram illustrating a configuration example of the cellular communication system according to a first embodiment.

FIG. 9 is a diagram illustrating an operation example of the first embodiment. The cellular communication system 1 illustrated in FIG. 9 is an example including the IAB node 300, the two IAB donors 200-1 and 200-2, and the UPF 12.

In step S100, the IAB node 300 and the IAB donor 200-1 are in an RRC connected state. The IAB node 300 is subordinate to the IAB donor 200-1.

In step S101, the IAB donor 200-1 transmits a dual donor request to the IAB donor 200-2. For example, IAB donor 200-1 uses an Xn interface to transmit the dual donor request to the IAB donor 200-2.

The dual donor request includes at least any one of three pieces of information below.

1) A BAP address of an IAB node permitting re-routing
2) Termination information for data forwarding between donors (a Transport Network Layer (TNL) address and the like)

3) A current routing configuration (including at least an IAB node performing re-routing) The above 1) is the BAP address of the IAB-MT of the IAB node 300 in the example of FIG. 9. The above 2) includes the TNL address of the IAB donor 200-1 in the example of FIG. 9. The above 3) includes information about routing between the IAB node 300 and the IAB donor 200-1 in the example of FIG. 9.

The IAB donor 200-2, having received the dual donor request, may generate a routing configuration for re-routing based on at least one of the information pieces 1) to 3) included in the dual donor request. In the example of FIG. 9, such a routing configuration may include a configuration for a path between IAB node 300 and IAB donor 200-2.

In step S102, the IAB donor 200-2 transmits an acknowledgement (dual donor request ack) to the IAB donor 200-1 in response to the dual donor request.

The acknowledgement includes at least any one of three pieces of information below.

4) A BAP address of the DU of the IAB donor (itself)
5) Termination information for data forwarding between donors (a TNL address and the like)
6) A routing configuration for re-routing generated by the IAB donor The above 4) is the BAP address of the DU of the IAB donor 200-2 in the example of FIG. 9. The above 5) includes the TNL address of the IAB donor 200-2 in the example of FIG. 9. The above 6) includes a configuration for a path between the IAB node 300 and the IAB donor 200-2 generated by the IAB donor 200-2 in the example of FIG. 9.

The IAB donor 200-1 can receive the acknowledgement in response to the dual donor request to acquire the TNL address of the IAB donor 200-2 as the termination information of the IAB donor 200-2. The IAB donor 200-2 can also acquire the TNL address of the IAB donor 200-1 as the termination information of the IAB donor 200-1 included in the dual donor request of step S101. Note that steps S101 and S102 describe an example in which the IAB donor 200-1 transmits the dual donor request and the IAB donor 200-2 transmits the acknowledgement, but the present invention is not limited thereto. In step S101, the IAB donor 200-2 may transmit a dual donor request and in step S102, the IAB donor 200-1 may transmit an acknowledgement. In step S102, the IAB donor 200-1 may transmit a negative acknowledgement. The negative acknowledgement is transmitted when the dual donor request is not accepted.

In step S103, the IAB donors 200-1 and 200-2 can therefore form a connection (tunnel) for data forwarding between the IAB donors 200-1 and 200-2. The IAB donors 200-1 and 200-2 configure a path for data forwarding based on the TNL addresses of the IAB donors 200-1 and 200-2.

In step S104, the IAB donor 200-1 transmits an RRC reconfiguration message to the IAB node 300 to perform RRC reconfiguration.

The RRC reconfiguration message may include at least three of pieces of information below.

7) Updated routing information (including a path for re-routing)
8) An indicator indicating permission for inter-donor re-routing
9) A BAP address of a DU of another donor
Note that, the above 9) is optional and is information indicating that such a BAP address may be sent.

The above 7) includes information on the path between the IAB donor 200-1 and the IAB donor 200-2, and information about the routing configuration including the IAB donor 200-2 in the example of FIG. 9. The above 8) may indicate permission for re-routing per BH RLC channel. The above 9) can also be used in a third embodiment described later.

In step S105, the IAB donor 200-1 transmits an F1 configuration update message to the IAB node 300 to reconfigure the F1 interface. The F1 reconfiguration update message may include at least 7) to 9) described above.

Note that only either one of the processes of the RRC reconfiguration in step S104 and the F1 configuration update in step S105 may be performed, or both may be performed as illustrated in FIG. 9. If only either one of the processes is performed, the pieces of information 7) to 9) described above are included in the message for the process to be performed. If both processes are performed, the pieces of information 7) to 9) described above may be included in both messages, or a part of the pieces of information 7) to 9) described above may be included in one message and the remaining information may be included in the other message.

In step S106, the IAB node 300 transmits an RRC reconfiguration complete message to the IAB donor 200-1.

A normal route of the UL packet (or data) without re-routing corresponds to step S107 to step S109.

Specifically, in step S107, the IAB node 300 receives the packet transmitted from the lower IAB node or the UE 100. In step S108, the IAB node 300 transmits the received packet to the IAB donor 200-1. The IAB donor 200-1 de-ciphers the received packet in step S108 and transmits the de-ciphered packet to the UPF 12 (or the network) in step S109.

On the other hand, when re-routing is performed, the following is performed. Specifically, in step S110, the IAB node 300 receives the packet transmitted from the lower IAB node or the UE 100.

In step S111, the IAB node 300 performs re-routing. For example, the IAB node 300 performs re-routing in response to reception of a Type 1 Indication (indication of backhaul link failure detection), a Type 2 Indication (indication during backhaul link failure recovery), or a Type 1/2 Indication from the upper node (an IAB node located at the upper level or the IAB donor 200). The IAB node 300 may determine to perform re-routing to the IAB donor 200-2 based on the information about the routing configuration including the IAB donor 200-2 in step S104 and/or step S105.

In step S112, the IAB node 300 transmits the packet to the IAB donor 200-2 through re-routing. For example, the IAB node 300 may add a marking to the packet to be re-routed and transmit the packet to the IAB donor 200-2.

In steps S113 and S114, the IAB donor 200-2 performs data forwarding of the received (re-routed) packet to the IAB donor 200-1 in a PDCP PDU state. The IAB donor 200-2 may perform data forwarding of the marked packet.

In step S115, the IAB donor 200-1 de-ciphers the received packet (PDCP PDU).

In step S116, the IAB donor 200-1 forwards the de-ciphered packet to the UPF 12.

By way of re-routing as described above, the UL packet is forwarded from the IAB node 300 via the IAB donor 200-2 to the IAB donor 200-1. For example, even when a failure or the like occurs between the IAB node 300 and the IAB donor 200-1, the UL packet can be forwarded from the IAB node 300 to the IAB donor 200-1.

Second Embodiment

In the first embodiment, an example of inter-donor re-routing in an UL direction of a packet is described. In a second embodiment, an example of inter-donor re-routing in a downlink (DL) direction is described.

Figure 10:
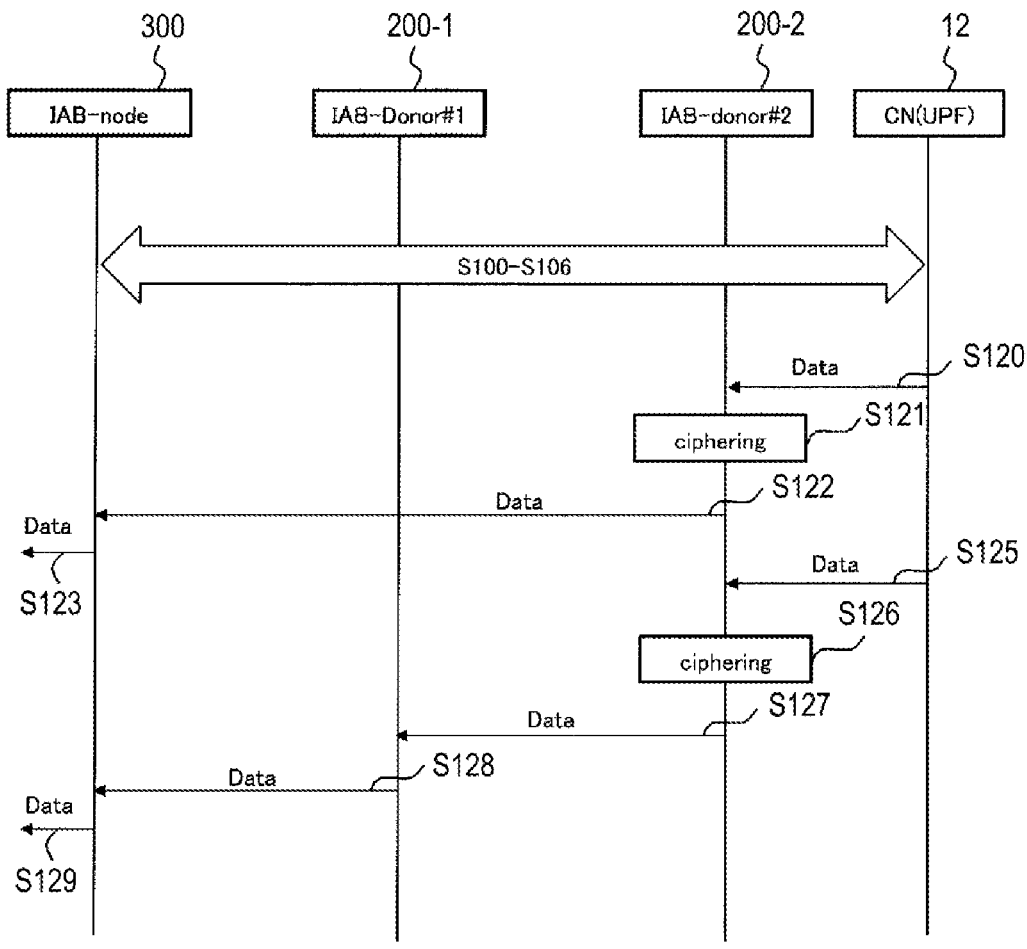
FIG. 10 is a diagram illustrating an operation example according to the second embodiment.

FIG. 10 is a diagram illustrating an operation example of the second embodiment.

As illustrated in FIG. 10, in the second embodiment, the processes in S100 to S106 are performed as in the first embodiment. The IAB node 300 in the second embodiment is, however, in an RRC connected state with the IAB donor 200-2, and is subordinate to the IAB donor 200-2.

A normal route of a DL packet (or data) without re-routing corresponds to step S120 to step S123.

Specifically, in step S120, the IAB donor 200-2 receives the packet transmitted from the UPF 12. In step S121, the IAB donor 200-2 ciphers the received packet. In step S122, the IAB donor 200-2 transmits the ciphered packet to the IAB node 300. In step S123, the IAB node 300 transmits the received packet to a lower IAB node or the UE 100.

On the other hand, when re-routing is performed because the DL packet cannot be directly transmitted from the IAB donor 200-2 to the IAB node 300 for some reason, the procedure is as follows. Specifically, in step S125, the IAB donor 200-2 receives a packet addressed to a destination (a lower node of the IAB node 300 or the UE 100).

In step S126, the IAB donor 200-2 ciphers the packet.

In step S127, the IAB donor 200-2 transmits the ciphered packet to the IAB donor 200-1 using a path for data forwarding.

In step S128, the IAB donor 200-1 transmits the packet received from the IAB donor 200-2 to the IAB node 300. The IAB node 300 then transmits the packet to the lower node or the UE 100.

Note that the IAB donors 200-1 and 200-2 may share the information on the BAP address of the IAB node 300.

In this way, also in the second embodiment, when the DL packet transmitted to the IAB donor 200-2 cannot be directly transmitted from the IAB donor 200-2 to the IAB node 300, the DL packet can be transmitted via the IAB donor 200-1 to the destination.

Third Embodiment

In the first embodiment, the example is described in which the routing configuration is newly performed for the route from the IAB node 300 via the IAB donor 200-2 to the IAB donor 200-1. In a third embodiment, a re-routable path is searched without performing a new routing configuration (or without changing the routing configuration).

Figure 11:
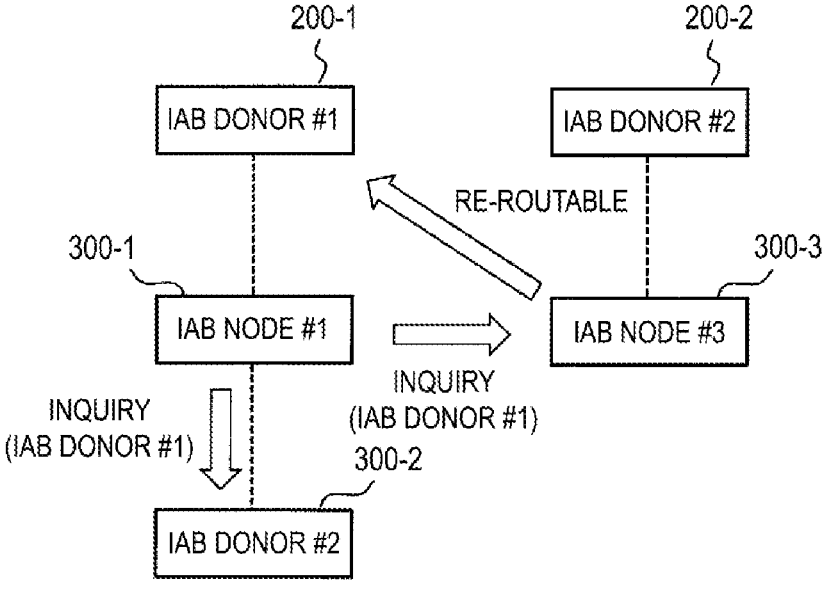
FIG. 11 is a diagram illustrating a configuration example of a cellular communication system according to a third embodiment.

FIG. 11 is a diagram illustrating a configuration example of a cellular communication system 1 according to the third embodiment.

As illustrated in FIG. 11, an IAB node 300-1 subordinate to the IAB donor 200-1 is present and an IAB node 300-2 is present as a lower node than the IAB node 300-1. An IAB node 300-3 subordinate to the IAB donor 200-2 is also present.

Figure 12:
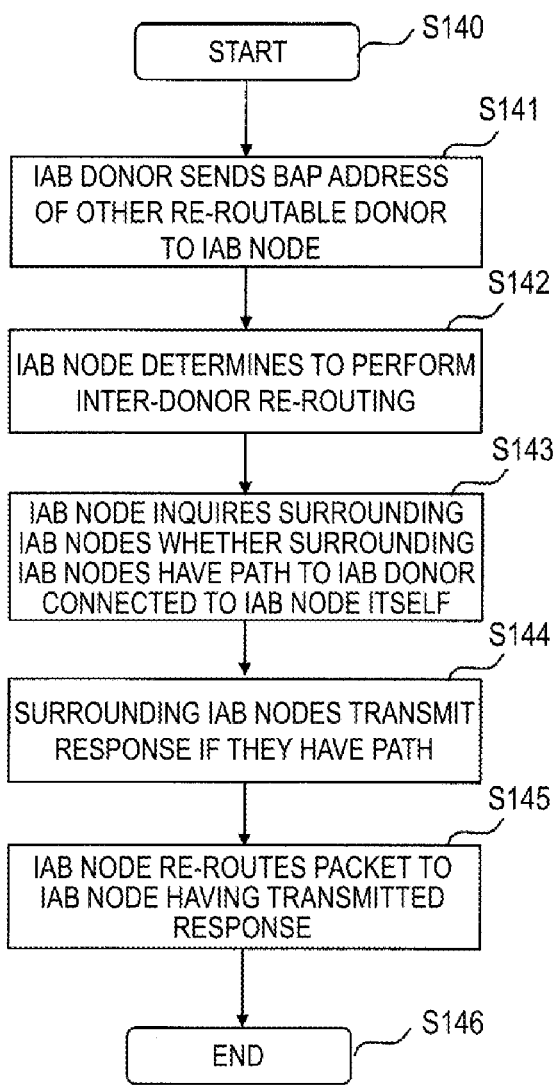
FIG. 12 is a diagram illustrating an operation example according to the third embodiment.

FIG. 12 is a diagram illustrating an operation example according to the third embodiment. The operation example in FIG. 12 is described with reference to the configuration example in FIG. 11.

As illustrated in FIG. 12, in step S140, the cellular communication system 1 starts processing.

In step S141, the IAB donor 200 sends, to the IAB node 300, a BAP address of another IAB donor that is re-routable. In the example of FIG. 11, the IAB donor 200-2 sends, to the IAB node 300-3, a BAP address of the DU of the IAB donor 200-1 that is re-routable. A process in step S141 is the same as, for example, the process in step S104 and/or step S105 of the first embodiment in which the IAB donor 200-1 transmits the BAP address of the DU of the IAB donor 200-2 to the IAB node 300. Note that instead of step S141 illustrated in FIG. 12, another method may be used to allow the IAB node 300 to recognize the BAP address of the DU of another IAB donor.

In step S142, the IAB node 300 determines to perform re-routing. In the example of FIG. 11, the IAB node 300-1 may receive the Type 1 Indication, the Type 2 Indication, or the Type 1/2 Indication to determine to perform re-routing.

Note that the Type 1 Indication is an example of a failure occurrence notification indicating that a BH RLF (Radio Link Failure) is detected. The Type 2 Indication is an example of a failure occurrence notification indicating that recovery from the BH RLF is being attempted. The Type 1/2 Indication is an example of a failure occurrence notification when not distinguishing the Type 1 indication and the Type 2 indication from each other.

Returning to FIG. 12, in step S143, the IAB node 300 inquires from the surrounding IAB nodes whether the surrounding IAB nodes have a path to the IAB donor 200 connected to the IAB node 300 itself. In the example of FIG. 11, the IAB node 300-1 inquires from the surrounding IAB nodes 300-2 and 300-3 whether the IAB nodes 300-2 and 300-3 have a path to the IAB donor 200-1 connected to the IAB node 300-1. An inquiry message may be, for example, a BAP Control PDU or a MAC CE. Alternatively, the inquiry message may use, for example, an SIB 1. When the IAB node 300-1 connects to a plurality of IAB donors 200, the inquiry message may include a plurality of BAP addresses in the form of a list.

Returning to FIG. 12, in step S144, the surrounding IAB nodes transmit responses if they have re-routable paths. In the example of FIG. 11, the inquired IAB node 300-3 has a path to the IAB donor 200-1. In other words, the BAP address of the DU of the IAB donor 200-1 that is re-routable is sent to the inquired IAB node 300-3 in advance. The IAB node 300-3 confirms that this BAP address matches the BAP address of the DU of the IAB donor 200-1 included in the inquiry message. Accordingly, the IAB node 300-3 determines that the re-routing is possible. The IAB node 300-3 transmits a response message to the IAB node 300-1. The response message may include an identifier of the donor having the path. The donor identifier may be a destination BAP address (the BAP address of the DU of the IAB donor 200-1 in the example of FIG. 11). If a plurality of destination BAP addresses are available, these may be represented in the form of a list. Note that the response message may be transmitted through the BAP Control PDU, the MAC CE, or the SIB 1, in a manner the same as and/or similar to the inquiry message.

On the other hand, in the example of FIG. 11, the IAB node 300-2 also receives the inquiry from the IAB node 300-1. Th IAB node 300-2 exists in the same topology as the IAB node 300-1. The IAB node 300-2 also has a path to the IAB donor 200-1. Thus, also in the IAB node 300-2, the BAP address of the IAB donor 200-1 included in the inquiry message matches the BAP address of the IAB donor 200-2 to which the IAB node 300-2 has the path. Therefore, the IAB node 300-2 also determines that re-routing is possible, and transmits a response message to the IAB node 300-1.

Returning to FIG. 12, in step S145, the IAB node 300 re-routes the packet to the IAB node to which the IAB node 300 has transmitted the response message. In the example of FIG. 11, the IAB node 300-1 transmits the packet received from another node or the UE 100 to the IAB node 300-3. The IAB node 300-3 transmits the received packet to the IAB donor 200-1. Thus, for example, the packet is not directly forwarded from the IAB node 300-1 to the IAB donor 200-1, but is forwarded via the IAB node 300-3 to the IAB donor 200-1. Even when a failure occurs in the BH link between the IAB donor 200-1 and the IAB node 300-1, the packet can be forwarded via the IAB node 300-3 to the IAB donor 200-1 that is the destination.

Fourth Embodiment

In the 3GPP, multi-MT is being discussed. Multi-MT is a technology in which, for example, the same IAB node 300 includes a plurality of IAB-MTs, and each IAB-MT is connected to a different IAB donor 200. With multi-MT, routes from one IAB node to a plurality of IAB donors 200 can be ensured. Therefore, route redundancy can be ensured or increased.

In the case of downstream, in order to ensure route redundancy, there may be a path from the first IAB donor 200-1 via the second IAB donor 200-2 to the IAB node 300 and a path from the first IAB donor 200-1 directly to the IAB node 300. When a plurality of IAB-MTs operate independently in one IAB node, it is not known whether the plurality of IAB-MTs exist in the same IAB node 300 or in different IAB nodes 300 in a BAP address space. If the plurality of IAB-MTs exist in the same IAB node 300, the packet can be routed by an operation the same as and/or similar to that of the second embodiment.

Figure 13:
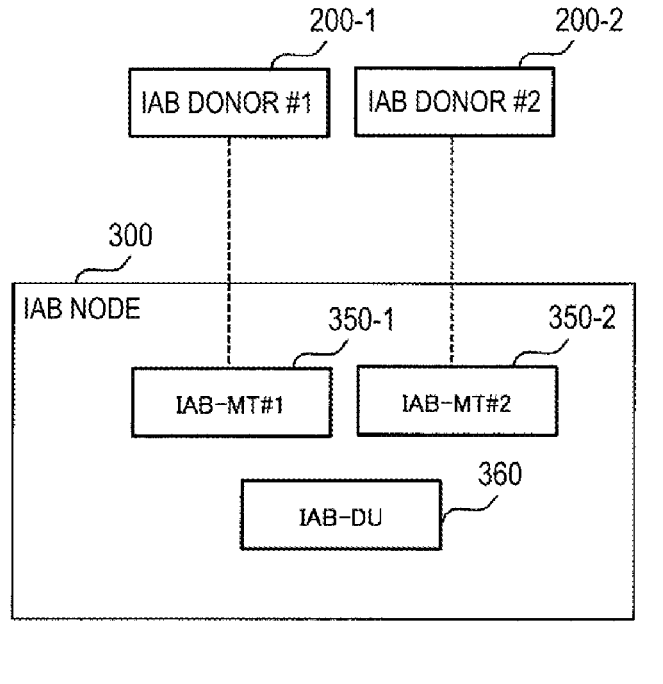
FIG. 13 is a diagram illustrating a configuration example of a cellular communication system according to a fourth embodiment.

FIG. 13 is a diagram illustrating a configuration example of a cellular communication system 1 according to a fourth embodiment.

In the example of FIG. 13, the IAB node 300 includes two IAB-MTs 350-1 and 350-2. The IAB node 300 includes an IAB-DU 360. The IAB MT 350-1 is connected to the IAB donor 200-1. On the other hand, the IAB-MT 350-2 is connected to the IAB donor 200-2.

Figure 14:
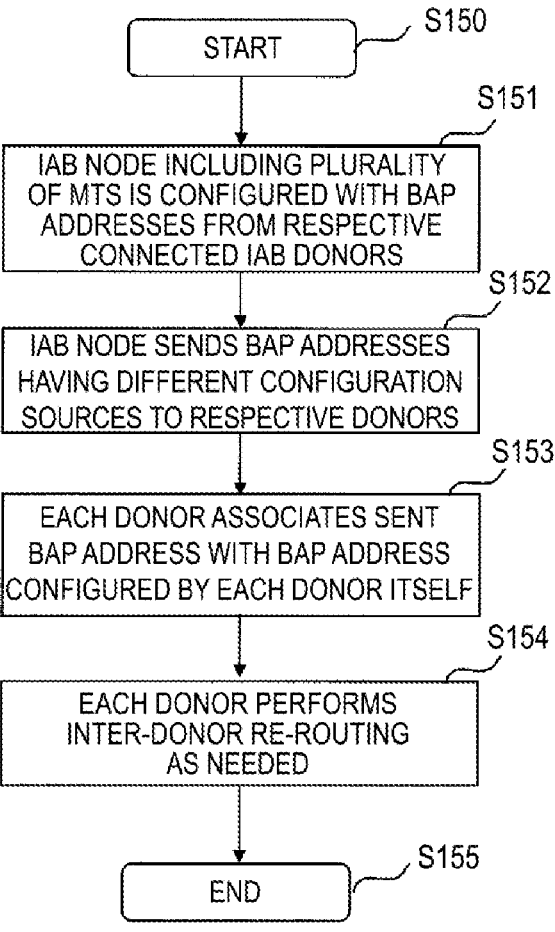
FIG. 14 is a diagram illustrating an operation example according to the fourth embodiment.

FIG. 14 is a diagram illustrating an operation example according to the fourth embodiment. The operation example illustrated in FIG. 14 is described with reference to the configuration example in FIG. 13.

As illustrated in FIG. 14, in step S150, the cellular communication system 1 starts processing.

In step S151, the IAB nodes 300 including the plurality of IAB-MTs is configured with BAP addresses from the respective connected IAB donors 200. In the example of FIG. 13, the IAB-MT 350-1 is configured with a BAP address #1 from the DU of the IAB donor 200-1. The IAB-MT 350-2 is configured with a BAP address #2 from the DU of the IAB donor 200-2. Note that in the following description, "configuring" and "assigning" may be used without distinction.

Returning to FIG. 14, in step S152, the IAB node 300 transmits the BAP addresses having different configuration sources to the respective donors 200. In the example of FIG. 13, the IAB-MT 350-1 transmits the BAP address #2 configured for the IAB-MT 350-2 to the IAB donor 200-1. The IAB-MT 350-2 transmits the BAP address #1 configured for the IAB-MT 350-1 to the IAB donor 200-2. Note that the IAB node 300 may transmit BAP addresses having different configuration sources at the time of initial configuration of the BAP address or at the time of configuration change of the BAP address.

Returning to FIG. 14, in step S153, each donor 200 associates the received BAP address with the BAP address configured by the donor 200 itself. In the example of FIG. 13, the IAB donor 200-1 associates the BAP address #2 received from the IAB-MT 350-1 with the BAP address #1 configured for the IAB node 300 by the IAB donor 200-1 itself. The IAB donor 200-2 associates the BAP address #1 received from the IAB-MT 350-2 with the BAP address #2 configured for the IAB node 300 by the IAB donor 200-2 itself. Each of the IAB donors 200-1 and 200-2 may determine that the received BAP address and the BAP address configured by the IAB donor 200 itself are from the same IAB node, and to associate the BAP addresses as such.

Returning to FIG. 14, in step S154, each IAB donor 200 performs re-routing as needed. In step S155, the cellular communication system 1 then ends a series of processing.

Fifth Embodiment

In the fourth embodiment, the problem in the case of downstream is described. For multi-MT, a problem in the case of upstream also exists. That is, packet routing needs to be performed between the BAP addresses configured for the respective IAB-MTs in the IAB node 300. This may occur even in the case of downstream.

In a fifth embodiment, the multi-MT IAB node 300 requests the IAB donor 200 to configure the same BAP address. For one IAB node 300, the same BAP address is configured for a plurality of IAB-MTs so that a plurality of IAB donors 200 can recognize the IAB node 300 as one IAB node. The plurality of IAB donors 200 can also ensure respective routes to the same IAB node 300 to ensure route redundancy. The packet routing may not need to be performed between the BAP addresses.

Figure 15:
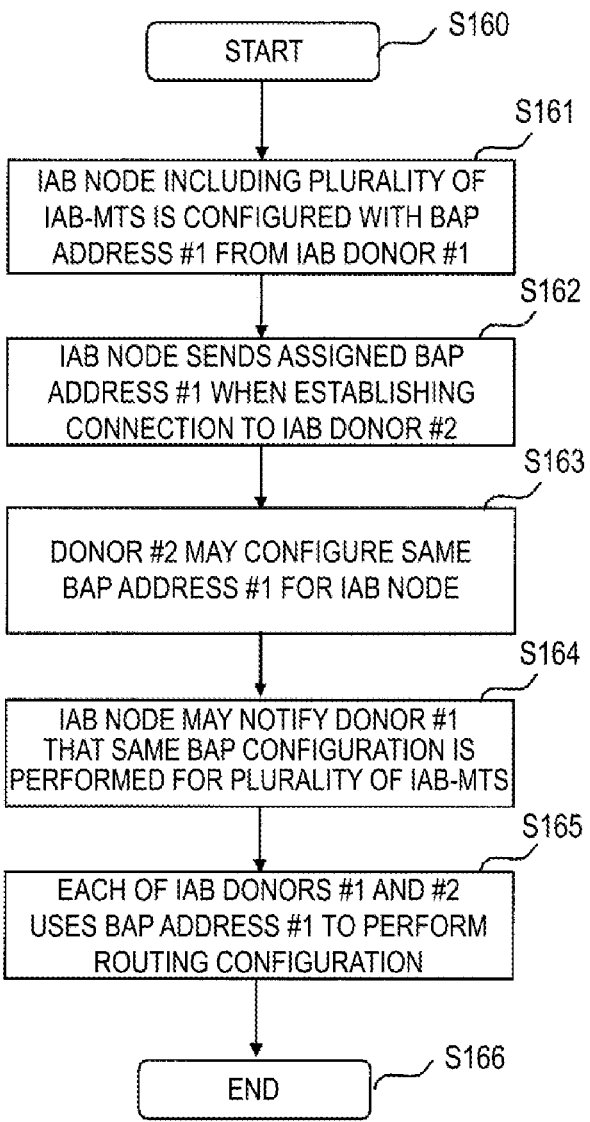
FIG. 15 is a diagram illustrating an operation example according to a fifth embodiment.

FIG. 15 is a diagram illustrating an operation example according to the fifth embodiment. The operation example illustrated in FIG. 15 is described with reference to the configuration example in FIG. 13 as appropriate.

As illustrated in FIG. 15, in step S160, the cellular communication system 1 starts processing.

In step S161, the IAB node 300 including a plurality of IAB-MTs is configured with the BAP address #1 from the IAB donor #1. In the example of FIG. 13, the IAB-MT 350-1 of the IAB node 300 is configured with the BAP address #1 from the IAB donor 200-1.

Returning to FIG. 15, in step S162, the IAB node 300 transmits the configured BAP address #1 to the IAB donor #2 when establishing connection to the IAB donor #2. In the example of FIG. 13, the IAB-MT 350-2 of the IAB node 300 transmits the BAP address #1 to the IAB donor 200-2 at when establishing connection to the IAB donor 200-2. The configured BAP address is transmitted by using, for example, at least one of messages below.

10) An RRC setup request, an RRC resume request,

11) RRC setup complete, RRC resume complete,

12) An F1 setup request, an F1 configuration update

Note that each message may include an identifier indicating that the IAB node 300 includes a plurality of IAB-MTs (or is a multi-MT).

Returning to FIG. 15, in step S163, the IAB donor #2 may configure the BAP address #1 the same as the assigned BAP address #1 received in step S162 for the IAB node 300. Note that the IAB node 300 is configured with the BAP address #1 in step S161, so step S163 may be omitted.

In step S164, the IAB node 300 may transmit, to the IAB donor #1, a notification indicating that the same BAP address #1 is configured for the plurality of IAB-MTs. Step S164 may be performed in order to prevent or reduce the occurrence of inadvertent change of the BAP address #1 in the IAB donor #1. Step S164 may be also omitted.

In step S165, each of the IAB donors #1 and #2 performs routing configuration using the BAP address #1.

In step S166, the cellular communication system 1 then ends a series of processing.

Other Embodiments

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the scope of the present invention. All of or a part of the embodiments can be combined together as long as no inconsistencies are introduced.

REFERENCE SIGNS

1: Mobile communication system
10: 5GC
11: AMF
12: UPF
100 (100-1 to 100-3): UE
110: Wireless communicator
111: Receiver
112: Transmitter
120: Controller
200 (200-1, 200-2): IAB donor
210: Wireless communicator
211: Receiver
212: Transmitter
220: Network communicator
221: Receiver
222: Transmitter
300 (300-1, 300-2, 300-3): IAB node
310: Wireless communicator
311: Receiver
312: Transmitter
320: Controller

The invention claimed is:

1. A communication control method used in a cellular communication system, the communication control method comprising:
transmitting, by a first donor base station, to a second donor base station, a request message including a backhaul adaptation protocol (BAP) address of a first relay node under the first donor base station;
transmitting, by the second donor base station, to the first donor base station, an response message in response to the request message, the response message including a BAP address of the second donor base station;
transmitting, by the first donor base station, to the first relay node, information about a routing configuration including the second donor base station;

transmitting, by the first relay node, a first packet to the second donor base station based on the information about the routing configuration;

forwarding, by the second donor base station, the first packet to the first donor base station; and transmitting, by the first donor base station the first packet to a network.

2. The communication control method according to claim 1, wherein the request message is a request message requesting communication between donor base stations.

3. The communication control method according to claim 1, wherein the request message is a request message for migration of the relay node traffic between donor base stations.

4. A first donor base station comprising:

a transmitter configured to transmit to a second donor base station, a request message including a backhaul adaptation protocol (BAP) address of a first relay node under the first donor base station, and a receiver configured to receive from the second donor base station, a response message in response to the request message, the response message including a BAP address of the second donor base station, wherein the transmitter is further configured to transmit to the first relay node, information about a routing configuration including the second donor base station, the receiver is further configured to receive from the second donor base station, a first packet transmitted from the first relay node to the second donor base station based on the information about the routing configuration, the transmitter is further configured to transmit the first packet to a network.

5. A second donor base station comprising:

a receiver configured to receive from a first donor base station, a request message including a backhaul adaptation protocol (BAP) address of a first relay node under the first donor base station, and a transmitter configured to transmit to the first donor base station, a response message in response to the request message, the response message including a BAP address of the second donor base station, wherein the receiver is further configured to receive from the first relay node, a first packet, and the transmitter is further configured to transmit the first packet to a network.

* * * * *